(No Model.) 3 Sheets—Sheet 1.

C. D. MARSH.
OUTSIDE MOLDING MACHINE.

No. 513,192. Patented Jan. 23, 1894.

Witnesses
E. F. Nottingham
G. F. Downing

Inventor
C. D. Marsh
By H. A. Seymour
Attorney

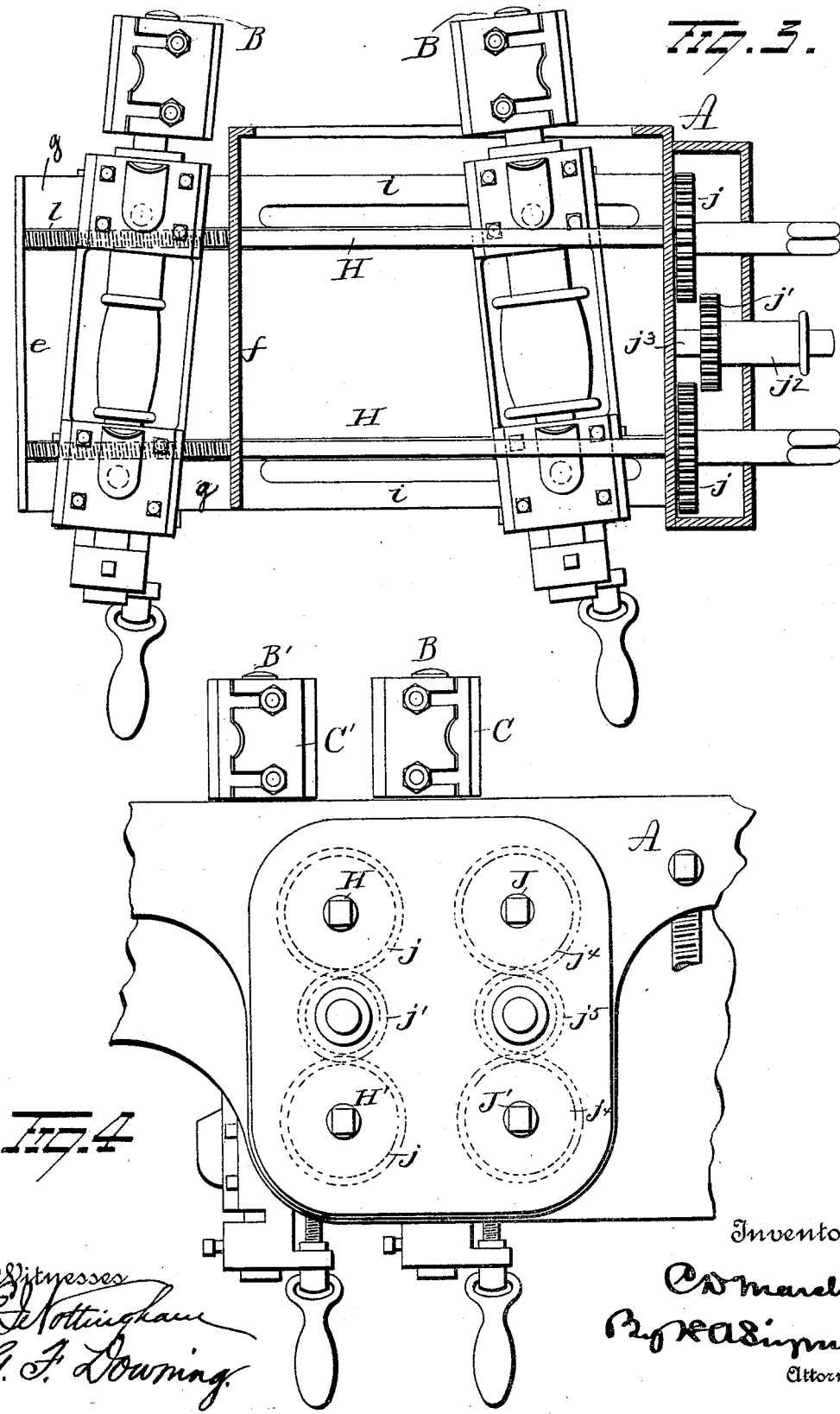

UNITED STATES PATENT OFFICE.

CALVIN D. MARSH, OF WILLIAMSPORT, PENNSYLVANIA, ASSIGNOR TO THE ROWLEY & HERMANCE COMPANY, OF SAME PLACE.

OUTSIDE MOLDING-MACHINE.

SPECIFICATION forming part of Letters Patent No. 513,192, dated January 23, 1894.

Application filed May 12, 1893. Serial No. 474,014. (No model.)

*To all whom it may concern:*

Be it known that I, CALVIN D. MARSH, of Williamsport, in the county of Lycoming and State of Pennsylvania, have invented certain new and useful Improvements in Outside Molding-Machines; and I do hereby declare the following to be a full, clear, and exact description of the invention, such as will enable others skilled in the art to which it appertains to make and use the same.

My invention relates to an improvement in outside molding machines. At the present time there are two classes of molding machines known to the trade viz: inside and outside molders. This application relates particularly to the latter class and it consists in two side cutter heads mounted on arbors supported in suitable boxes, and means located on the outside, or working side of the machine whereby the said cutter heads can be moved toward and away from each other, or either or both tilted to any desired angle or inclination.

Figure 1:
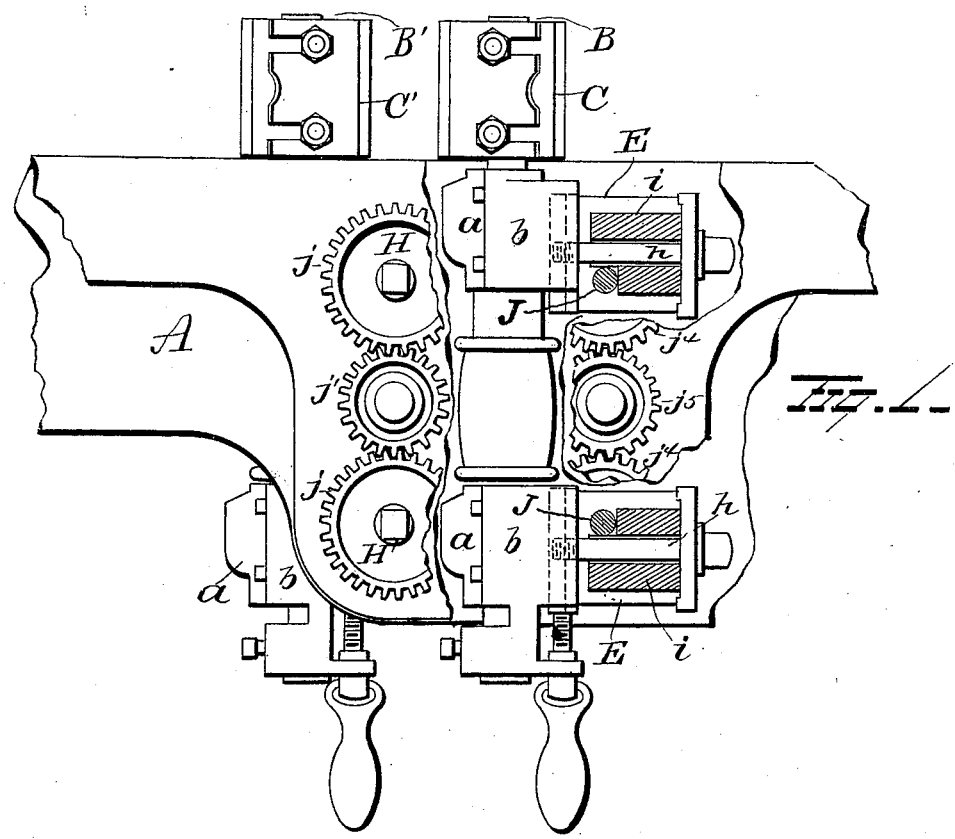
Figure 2:
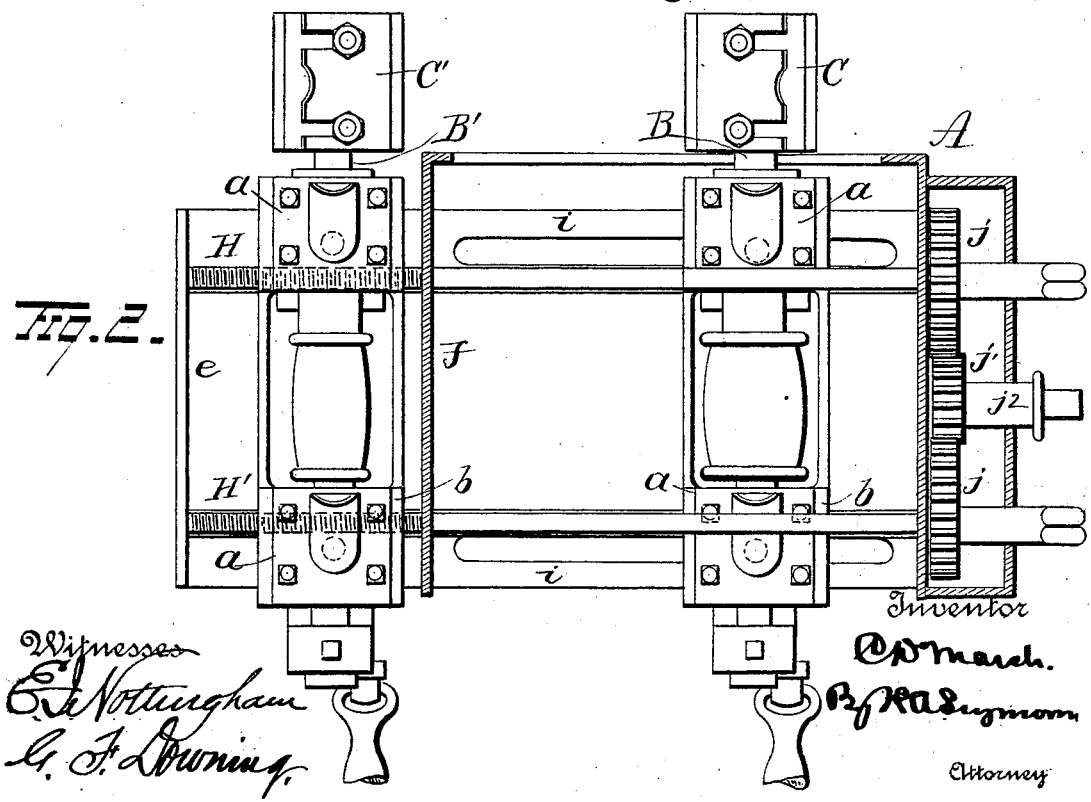
Figure 5:
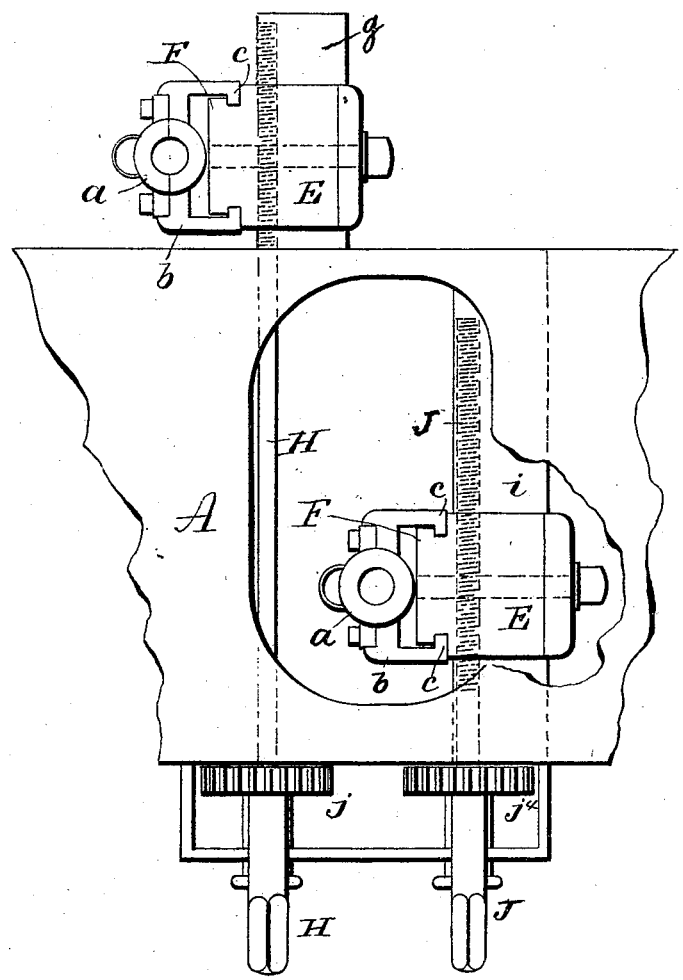

In the accompanying drawings, Figure 1 is a view in side elevation partly in section of a portion of a molder embodying my invention. Fig. 2 is a view in transverse section of same. Fig. 3 is a similar view showing the cutters inclined. Fig. 4 is a view in side elevation from the outer side of the machine showing the gearing in dotted lines, and Fig. 5 is a plan view, portion of the machine being broken away.

A represents the frame of the machine which can be of any desired size or shape, and B and B' are the arbors carrying the side cutter heads C C'. The arbor B' carrying the cutter head C' is designed to have only a limited lateral movement while shaft B carrying cutter head C is designed to travel practically from cutter head C' to the outer or working side of the machine. Each shaft is mounted in bearings $a$ each of which is formed in or carried by the block $b$ having side flanges $c$. Each arbor is mounted in two boxes located respectively near the upper and lower ends thereof, and each box is carried by a block having the flanges $c$.

Running transversely across the machine from the in, or off side $e$ to the partition $f$ are the guides or ways $g$ on which the slides E are mounted. These slides are free to move on the guides or ways which latter are slotted for the passage of the bolts $h$. These bolts $h$ pass through the slides and ways and centrally through the plates F which latter are grooved as at $i$ for the reception of the flanges $c$ of the blocks $b$. By pivoting the plates F by a single bolt it will be seen that they can turn on the axes, and by connecting the blocks $b$ to the slides E by the flanges and grooves the arbor and head thereon can be adjusted vertically.

The heads just described are adjusted by the screws H H', suitably mounted in the frame of the machine in the same vertical plane one above the other, the screw H passing through the upper slide E, while the screw H' passes through the lower slide, the said slides being screw threaded to engage the threads on the screws. With such construction it will be seen that by turning one screw the arbor and head thereon, are moved to an inclined position, the direction of inclination depending on the direction in which the screw is turned.

Each shaft terminates on the outside or working side of the machine, and each is provided with an angular end for the attachment of a wrench or crank for turning same. In order to enable me to move the arbor and head thereon laterally, while either in a vertical or inclined position, and that without disturbing or changing in the slightest the relative positions of the cutting edges of the cutter to the table whether the cutters be inclined or vertical, I have provided both shafts with pinions of the same size, and interposed an idle pinion $j'$ adapted when moved inwardly to engage both pinions $j$. Hence when motion is imparted to either shaft H or H' it is transmitted to the other through the intervention of the idle wheel $j'$. The idle wheel $j'$ is integral with or attached to the sleeve $j^2$ mounted on the fixed stem $j^3$ and by simply pulling outwardly on the sleeve $j^2$ the idle wheel $j'$ is disengaged from pinion $j$ thus leaving the shafts free to be operated independently of each other.

For the purpose of illustration we will suppose the idle wheel $j'$ to be disengaged as shown in Fig. 3. Now by turning shaft H' in one direction, or the shaft H in the opposite direction the arbor and head can be turned to a greater inclination or be brought to a vertical position as shown in Fig. 2. After the desired position of the cutter has been secured, the arbor can be moved laterally without changing in the slightest, the inclination of the cutters, by simply connecting the pinions $j$ by the idle pinion $j'$ and turning either shaft H or H'. The other arbor B is mounted in the same manner on the guides or ways $i, i$, which as clearly shown in Fig. 3 are longer than the ways $e$, and hence permit of a greater range of movement. This arbor is actuated by the screws J J', having pinions $j^4$ thereon, and by the idle pinion $j^5$. The manner of mounting the arbor B and its operation is identical with the construction and operation of the arbor B' and hence a further description of the same is not necessary.

From the foregoing it will be seen that the operator standing on the outside or working side of the machine has full control over the cutters and that without moving from his position and as the slides are held securely by the screws, it is not necessary to tighten up the parts supporting the arbor, after the adjustments have been made. The position of the cutters can be changed in an instant, and are held firmly in position.

I would have it understood that I do not confine myself to manner described of mounting the arbors as the same result may be accomplished by other constructions, but consider myself at liberty to make such changes in the details of construction as fairly fall within the spirit and scope of my invention.

Having fully described my invention, what I claim as new, and desire to secure by Letters Patent, is—

1. In an outside molding machine, the combination with an inside arbor, a cutter head thereon, an outside arbor and cutter head thereon, and two slides supporting each arbor, of a screw for adjusting each slide, the said screws being arranged in pairs and carried through to the front or working side of the machine, and means located on the outside or working side for coupling and uncoupling the screws of each pair whereby they can be operated simultaneously to move the cutter head laterally without changing its angle or inclination, or operated independently for changing the angle or inclination of the cutter head.

2. The combination with an inside arbor and an outside arbor each having a cutter head thereon, and an upper and lower bearing for each arbor, of two screws for each arbor, each screw passing through a bearing whereby either bearing can be adjusted from the front or working side of the machine without moving the other, and means located on the outside or working side for coupling up the two screws of each arbor, whereby they can be operated simultaneously.

3. In an outside molding machine, the combination with two pairs of guides or ways, a laterally movable slide mounted on each way, the said slides being arranged in pairs, an inside arbor supported by one pair of slides, an outside arbor supported by the other pair of slides, and a cutter on each arbor, of screws arranged in pairs each screw engaging a slide, pinions on the screws, the said pinions being on the front or working side of the machine, and an interposed adjustable idle pinion for each pair of screws, substantially as set forth.

4. In an outside molding machine, the combination with an inside head mounted on an arbor and laterally movable slides carrying said arbor, of screws passing through the sides and terminating on the front or working side of the machine, and means for coupling said screws whereby they can be operated simultaneously for moving the arbor laterally without changing its angle or inclination and for uncoupling said screws whereby they can be actuated independently of each other for changing the angle or inclination of said arbor, substantially as set forth.

In testimony whereof I have signed this specification in the presence of two subscribing witnesses.

CALVIN D. MARSH.

Witnesses:
L. R. RUSSEL,
T. E. LEWIS.